(12) United States Patent
Moroney et al.

(10) Patent No.: US 10,084,941 B2
(45) Date of Patent: Sep. 25, 2018

(54) GENERATING COLOR SIMILARITY MEASURES

(71) Applicant: Hewlett-Packard Development Company, L.P., Houston, TX (US)

(72) Inventors: Nathan Moroney, Palo Alto, CA (US); Melanie M Gottwals, San Jose, CA (US); Ingeborg Tastl, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/307,349

(22) PCT Filed: Apr. 30, 2014

(86) PCT No.: PCT/US2014/036231
§ 371 (c)(1),
(2) Date: Oct. 27, 2016

(87) PCT Pub. No.: WO2015/167556
PCT Pub. Date: Nov. 5, 2015

(65) Prior Publication Data
US 2017/0048419 A1     Feb. 16, 2017

(51) Int. Cl.
*H04N 1/60* (2006.01)
*G06K 9/62* (2006.01)
*G06K 9/72* (2006.01)

(52) U.S. Cl.
CPC ......... *H04N 1/6008* (2013.01); *G06K 9/6276* (2013.01); *G06K 9/723* (2013.01); *H04N 1/60* (2013.01)

(58) Field of Classification Search
None
See application file for complete search history.

(56) References Cited

U.S. PATENT DOCUMENTS

| | | | | |
|---|---|---|---|---|
| 5,903,892 A | * | 5/1999 | Hoffert | G06F 17/30017 |
| 7,415,153 B2 | | 8/2008 | Mojsilovic | |
| 2003/0101151 A1 | * | 5/2003 | Holland | G06N 3/004 |
| | | | | 706/45 |
| 2004/0175031 A1 | | 9/2004 | Katsuyama | |
| 2005/0149510 A1 | * | 7/2005 | Shafrir | G06F 17/30672 |
| 2005/0273336 A1 | * | 12/2005 | Chang | G06F 8/315 |
| | | | | 704/257 |
| 2006/0179022 A1 | * | 8/2006 | Holland | G06N 3/004 |
| | | | | 706/45 |
| 2007/0116353 A1 | | 5/2007 | Moroney | |

(Continued)

OTHER PUBLICATIONS

Reshma, I.A et al, "KDEVIR at ImageCLEF 2013 Image Annotation Subtask", Jun. 19, 2013.

*Primary Examiner* — Madelein T Nguyen
(74) *Attorney, Agent, or Firm* — Dicke Billig & Czaja PLLC

(57) ABSTRACT

A system including a memory to store instructions and initial color representations and a processor to execute the instructions in the memory to reference a database having a set of lexical color classifiers, transform each of at least a pair of initial color representations to color values associated with the set of lexical color classifiers, and generate a relative similarity measure related to the at least a pair of initial color representations based on the color values associated with the set of lexical color classifiers.

20 Claims, 4 Drawing Sheets

(56) References Cited

U.S. PATENT DOCUMENTS

| | | | |
|---|---|---|---|
| 2008/0046410 A1 | 2/2008 | Lieb | |
| 2011/0135195 A1* | 6/2011 | Marchesotti | G06K 9/4652 |
| | | | 382/165 |
| 2011/0238659 A1 | 9/2011 | Chittar et al. | |
| 2011/0320468 A1* | 12/2011 | Child | G06F 17/2223 |
| | | | 707/756 |
| 2012/0283574 A1 | 11/2012 | Park et al. | |
| 2013/0230255 A1 | 9/2013 | Wang et al. | |
| 2014/0029856 A1 | 1/2014 | Cai et al. | |
| 2014/0149103 A1* | 5/2014 | Child | G06F 3/018 |
| | | | 704/8 |
| 2015/0339525 A1* | 11/2015 | Marcelli | G06K 9/00416 |
| | | | 382/161 |
| 2017/0075877 A1* | 3/2017 | Lepeltier | G06F 17/2705 |

\* cited by examiner

| | ORANGE1 | ORANGE2 | BLUE | PURPLE |
|---|---|---|---|---|
| | 235,91,18 | 255,126,56 | 12,49,181 | 118,0,151 |
| $\Delta \Sigma_{gl}$ | 12.8 | | 12.8 | |
| BLACK | 0 | 0 | 0 | 0 |
| BLUE | 0 | 0 | 50 | 1 |
| BROWN | 0 | 0 | 0 | 0 |
| GRAY | 0 | 0 | 0 | 0 |
| GREEN | 0 | 0 | 0 | 0 |
| ORANGE | 47 | 39 | 0 | 0 |
| PINK | 0 | 0 | 0 | 1 |
| PURPLE | 0 | 0 | 0 | 49 |
| RED | 3 | 10 | 0 | 0 |
| WHITE | 0 | 0 | 0 | 0 |
| YELLOW | 0 | 0 | 0 | 0 |
| $\Delta S = \frac{\Sigma A \cdot B}{\sqrt{\Sigma A^2} \cdot \sqrt{\Sigma D^2}}$ | | 0.98 | | 0.02 |

Fig. 2

GENERATING COLOR SIMILARITY MEASURES

BACKGROUND

Devices, consumables, and software directly or indirectly reproduce, encode, or process color. The categorical perception of color differences can be different from the calculated color differences using known color difference metrics.

BRIEF DESCRIPTION OF THE DRAWINGS

FIG. 2 is a color matrix according to an example of the present disclosure.

DETAILED DESCRIPTION

Figure 1:
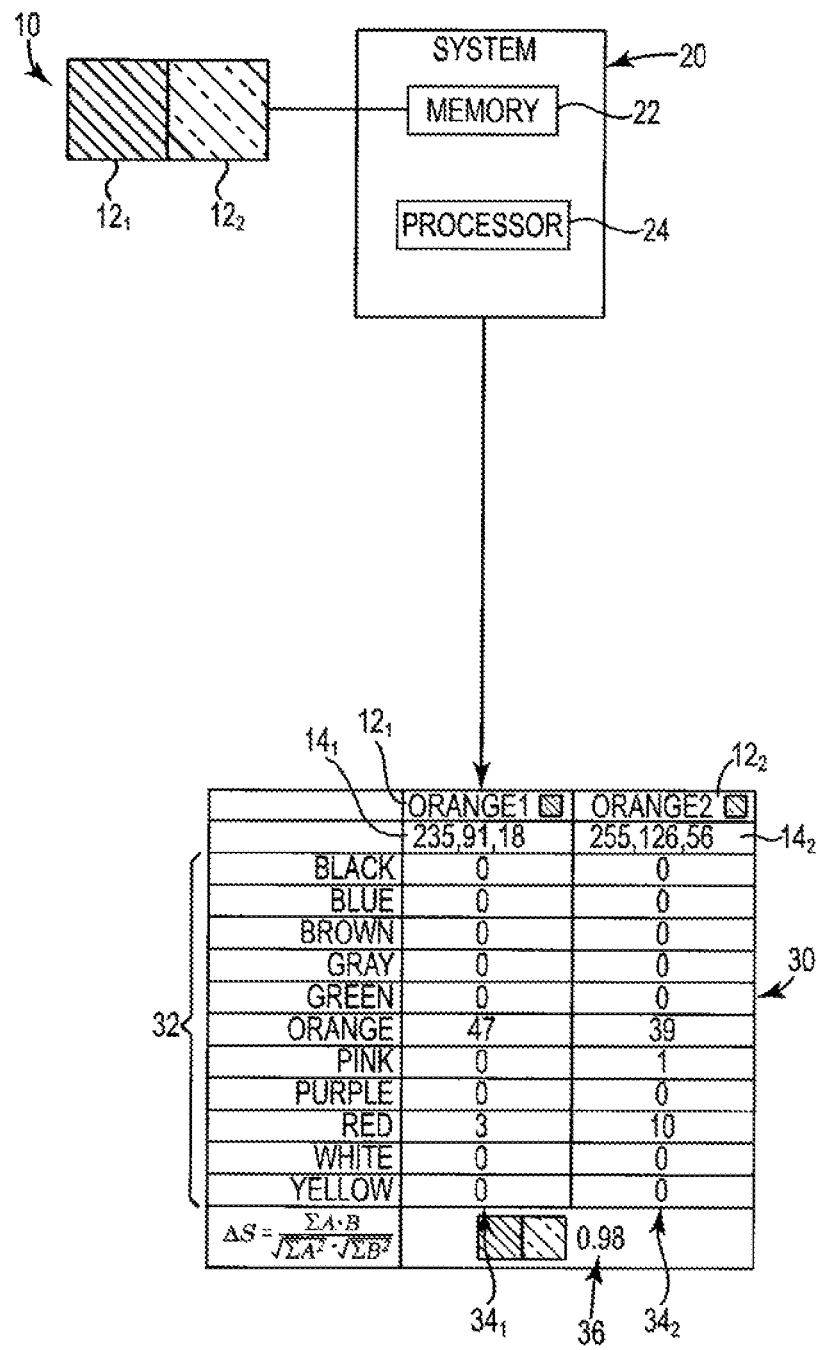
FIG. 1 is a schematic illustration of a system for generating a color similarity measure from initial color representations according to an example of the present disclosure.

In the following detailed description, reference is made to the accompanying drawings which form a part hereof, and in which are shown by way of illustration specific examples in which the disclosure can be practiced. It is to be understood that other examples may be utilized and structural or logical changes can be made without departing from the scope of the present disclosure. The following detailed description, therefore, is not to be taken in a limiting sense, and the scope of the present disclosure is defined by the appended claims. It is to be understood that features of the various examples described herein can be combined, in part or whole, with each other, unless specifically noted otherwise.

Color measurement and color reproduction is used in commercial printing, for example. Commercial print automation, such as that used in printing commercial publications, direct mailings, and catalogs, use color matching for color reproduction. Color matching functions can enable electronic color measurement in many practical applications, such as commercial print automation. Color matching functions can also be used in other applications. For example, a color image can be captured on an input device such as a mobile smart phone, tablet, or other input device capable of capturing a color image and a color matching function can be used to select a matching paint, carpet or other object. Identifying color differences is central to many color applications including attempts to quantify "good enough" color reproduction, color palette construction, image retrieval and categorically optimized profiles or color transformations. Therefore, a system that can determine when colors stop matching is desirable.

Color similarity, or dissimilarity, can be based on categorical perception or a separation of color differences. There are systems available for determining color similarities. For example, color difference metrics such as the ones based on the Commission International de l'Eclairage Lightness and color-opponent dimension A and B (CIELAB) encoding including CIELAB 1976 $\Delta E^*_{ab}$, $\Delta E_{94}$, and $\Delta E_{00}$ have been used to determine small and just perceptible color differences. Existing color similarity/difference metrics are typically primarily a geometric calculation of three dimensional numerical color values. For example, colors can have three-dimensional red-green-blue (ROB) color space values and geometric computations in three-dimensional space can be used to determine whether or not colors are similar or matching. However, the existing color difference metrics do not account for categorical color differences. For example, color variations identified between blue and purple using existing systems and methods can result in only a small difference quantifying these colors as roughly equivalent even though, perceptually and categorically, they have a large color difference (i.e. blue and purple being perceived as different color categories).

Small color differences can be used to determine when colors stop matching and large color differences can be used to determine when colors cross categorical boundaries, such as from purple to blue. In accordance with aspects of the systems and methods of this disclosure, large color space distortions, such as blue-purple warping occurring in CIELAB and other existing systems and methods, can be avoided and categorical perception effects, such as within category differences which appear smaller than across category differences, can be modeled correctly. For example, categorical color differences between cobra having a value greater than 10 in $\Delta E76$ can be determined with systems and methods of the present disclosure. Small color differences can also be measured and determined according to systems and methods of the present disclosure.

Examples provide systems and methods for generating and modeling color similarity and dissimilarity. An example of a system 20 for generating color similarity from an initial color set 10 stored in memory 22 is illustrated in FIG. 1. In one example, initial color set 10 includes initial color representations $12_1$ and $12_2$. Examples of initial color representations $12_1$, $12_2$ can be color images such as a pixel color or a palette color from a computer generated image, a printed image, a graphic, or a scan. Although initial color set 10 illustrated in FIG. 1 is shown to include a pair of initial color representations $12_1$, $12_2$, any other quantity of color representations $12_1$ through $12_x$ is acceptable.

Initial color representations $12_1$, $12_2$ can have associated initial color attribute values $14_1$, $14_2$ in the form of color space vector values, such as red-green-blue (RGB) vector values, for example. In accordance with aspects of the present disclosure, the initial RGB, CIELAB, or other form of initial color attribute values $14_1$, $14_2$ are numeric three dimensional color representations. Examples of initial color attribute values $14_1$, $14_2$ in the form of RGB vector values are illustrated in matrix 30 of FIG. 1. Initial color attribute values $14_1$, $14_2$, such as the RGB vector values shown, are each transformed into lexical color classifiers having lexical color attribute values as described in more detail below.

In order to generate results of relative color similarity, including color similarity measurements, initial color representations $12_1$, $12_2$ are received via an input device (see, e.g., FIGS. 4-6) by system 20. Initial color attribute values $14_1$, $14_2$ corresponding to each of initial color representations $12_1$, $12_2$ can be received by system 20 or generated within system 20. A memory 22 of system 20 stores initial color representations $12_1$, $12_2$ and associated initial color attribute values $14_1$, $14_2$, as appropriate, and a processor 24 of system 20 processes initial color attribute values $14_1$, $14_2$ as discussed in greater detail below. In addition, processor 24 of system 20 can select a set of lexical color classifiers 32 from a color naming database (described further below) based on initial color attribute values $14_1$, $14_2$. Lexical color classifiers 32 can be color terms in the form of natural language or text strings, for example. The color naming database can be the multi-million name Monroe and Ellis color naming database, for example, and a specific sub-database of lexical color classifiers 32 can be extracted based on a given vocabulary of terms. Other color naming databases are also acceptable. The color naming sub-database is constructed directly using initial color attribute values $14_1$, $14_2$ (e.g., RGB values). In one example, as shown in the left column of matrix 30 in FIG. 1, a set of lexical color classifiers 32 including black, blue, brown, gray, green, orange, pink, purple, red, white, and yellow are selected.

A machine color naming process can be used to convert numeric initial color attribute values $14_1$, $14_2$ to lexical color classifiers 32. The machine color naming process can be a k-nearest neighbor algorithm, random force, or other suitable algorithm. A technique such as a k-nearest neighbor technique, for example, is applied to the initial color attribute values $14_1$, $14_2$ to categorize initial color attribute values $14_1$, $14_2$ into the selected sub-database of lexical color classifiers 32. With reference to FIG. 1, in one example, the k-nearest neighbor algorithm is set to k equals 50 so that the resulting lexical color attribute values 34 associated with lexical color classifiers 32 are with respect to the 50 nearest neighbors of the color naming-database for any given initial color attribute values $14_1$, $14_2$. The k value and the quantity and type of lexical color classifiers 32 can be varied. Initial color set 10 and matrix 30 of FIG. 1 are illustrative examples of one of many possibilities.

The methods and systems of the present disclosure transform initial color attribute values $14_1$, $14_2$, such as the three-dimensional RGB values illustrated in FIG. 1, into multi-dimensional lexical color classifiers 32 in the selected sub-database. There can be a dimensional expansion from initial color attribute values $14_1$, $14_2$ to a larger dimensioned lexical color classifiers 32. For example, there can be "n" number of color vector dimensions for each initial color attribute value $14_1$, $14_2$, and "n+m" number of color vector dimensions, or color terms, in the selected set of lexical color classifiers 32. In one example, the multi-dimensional lexical color classifiers 32 include eleven color vector dimensions, or color terms, based on eleven color lexical color classifiers 32 selected and forming the sub-database.

In order to determine color similarity, a complete listing of lexical color classifiers 32 and count of each lexical color attribute value 34 is determined. It can be noted that in many circumstances, even though each initial color attribute value $14_1$, $14_2$ (e.g., three dimensional RGB color vectors) is converted to lexical color attribute values $34_1$, $34_2$ of lexical color classifiers 32 for a given region of color space, typically only a few lexical color classifiers 32 are in use for each initial color representation $12_1$, $12_2$. Every occurrence of a respective lexical color classifier 32 is a positive numeric color vector count for that particular lexical color classifier 32. If there are no occurrences for a particular lexical color classifier 32, a zero color vector count for that respective lexical color classifier 32 is included in the lexical color attribute value 34. Initial color representations $12_1$, $12_2$ can have lexical color attribute values $34_1$, $34_2$ occurring (i.e., a positive numeric vector occurrence) in multiple lexical vector classifiers 32. For example, as illustrated in FIG. 1, initial color representation $12_1$ has 47 orange lexical vector occurrences and 3 red lexical vector occurrences. More particularly, the color term vector count for initial color representation $12_1$ is 0, 0, 0, 0, 0, 47, 0, 0, 3, 0, 0.

The application of algorithms and measures to generate color differences via lexical dimensional expansion can effectively determine a categorical separation. A cosine similarity measure can be used to determine the similarity between initial color representations $12_1$, $12_2$ being compared based on lexical color attribute values $34_1$, $34_2$. In one example, a similarity measure can be based on a cosine similarity as opposed to a Euclidian distance. Cosine similarity is useful for comparing multiple (e.g., more than three) textual vectors while Euclidian distance is useful for comparing two or three distance vectors. Other distance measures that are texturally based can be used to determine color similarity. In other words, color similarity distances are calculated based on textual vectors. Lexical similarity matrixes, such as those used in the present examples, can be broadly applicable for imaging application and can be appropriate when more complex, numeric measures are ambiguous. Generally, to determine the similarity between two colors, vectors are multiplied together in a vector representation to generate a color distance measure. In one example, cosine similarity is determined by:

$$\Delta S = \frac{\sum A \cdot B}{\sqrt{\sum A^2} \cdot \sqrt{\sum B^2}}$$

In the above cosine similarity determination "A" and "B" are color term vectors being compared. Matrix 30 is shown for illustrative purposes only, and may or may not be produced for user viewing by system 20. In some examples, only the generated relative similarity 36, or color similarity measure, generated by system 20 based on initial color representations $12_1$, $12_2$ is produced for user viewing.

With additional reference to FIG. 2, the present methods and systems can build categorical boundaries into the generated color similarity difference results. For example, the similarity measure starts at 1.0 for a perfect match and decreases in value as the match decreases to a value of 0.0 when the colors are a total mismatch. This is opposite to a ΔE similarity measure where the 0.0 is a perfect match and the value increases with a greater mismatch. In some examples, a threshold value between 1.0 and 0.0 is established to differentiate a match from a non-match.

With additional reference to FIG. 2, initial color representations $12_1$, $12_2$ with similar lexical color attribute values $34_1$, $34_2$ or color naming statistics, can be quantified as similar as indicated by the relative similarity measurement $36_1$ and initial color representations $12_3$, $12_4$ differing in lexical color attribute values $34_3$, $34_4$, or color naming statistics, can be quantified as dissimilar as indicated by the generated relative similarity measurement $36_2$. With specific reference to the example initial color representations $12_1$, $12_2$ of FIGS. 1 and 2, the generated similarity measurement $36_1$ is 0.98. Accordingly, example initial color representations $12_1$, $12_2$ of FIG. 1 are highly similar, and thus, a match. Additionally, as illustrated in FIG. 2, the generated similarity measurement $36_2$ of initial color representations $12_3$, $12_4$ is 0.02. Accordingly, example initial color representations $12_3$, $12_4$ of FIG. 2 are highly dissimilar, and thus, a non-match. In this manner, even though each of the pairs initial color representations $12_1$, $12_2$ and initial color representations $12_3$, $12_4$ in the example illustration of FIG. 2 each have a $\Delta E_{94}$ similarity value of 12.8, representing the same degree of similarity for both pairs in CIELAB, initial color representations $12_3$, $12_4$ can be determined as categorically different in accordance with the present systems and methods. Unlike the CIELAB color difference metrics, the present similarity measurements for initial color representations, including those having large color differences, are not based on the CIELAB color space. In this manner, large color differences can be determined when colors Cross categorical boundaries, such as from purple to blue.

In accordance with the present systems and methods for generating color similarity measurements, the generated color similarity measure can be used to compare physical objects, images, or databases. Color can be used as one of the components in image based retrieval using the similarity measure. For example, in a retrieval context for a web service, a database of products on the internet can be searched for products matching, or similar to, a specific color. A mobile application on a cell phone or other mobile device can be used to extract and compare colors for matching. Color similarity during reproduction by multiple types of devices can be accessed with the systems and methods of the present disclosure. For example, color similarity in an ink jet printer and an industrial press and an image displayed on a computer monitor or screen of a mobile electronic device can be accessed. In one example, based on the relative similarity, images can be sorted.

Figure 3:
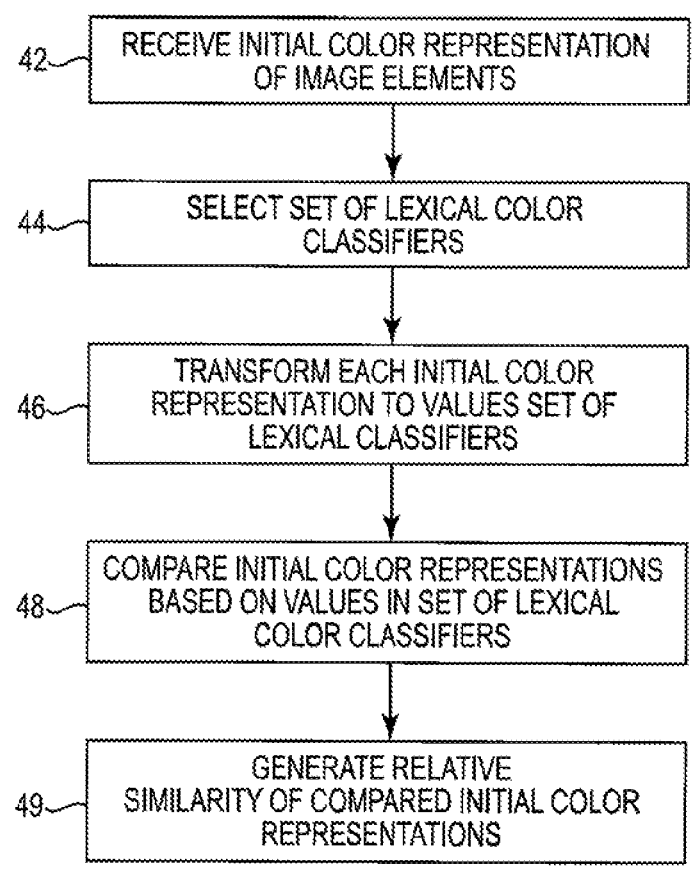
FIG. 3 is a flow chart illustrating an example method for generating a measure of color similarity according to an example of the present disclosure.

FIG. 3 illustrates an example of a method of generating color similarity measurement. At 42, initial color representations of image elements are received. At 44, the set of lexical color classifiers are selected. At 46, each initial color representation is transformed into values in the set of lexical color classifiers. At 48, initial color representations are compared based on values in the set of lexical color classifiers. At 49, a relative similarity of compared initial color representations is generated.

Figure 4:
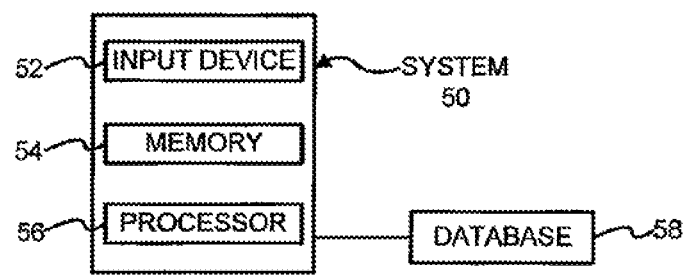
FIG. 4 is a block diagram of an example system.
Figure 5:
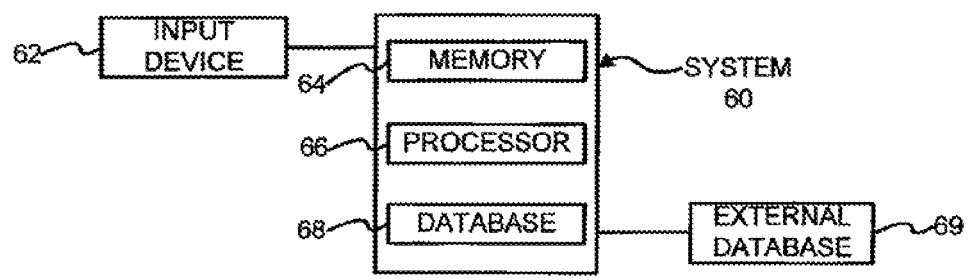
FIG. 5 is a block diagram of an example system.
Figure 6:
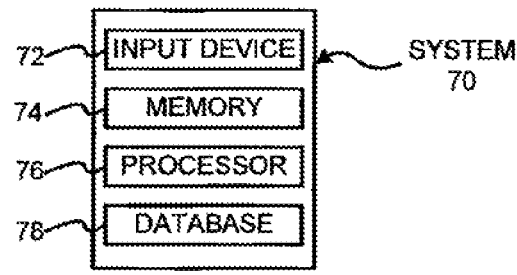
FIG. 6 is a block diagram of an example system.

FIGS. 4 through 6 illustrate block diagrams of example systems employed to measure and generate color similarity of at least a pair of color representations. Systems 50, 60, 70 can be employed to receive initial color representation input including and generate a relative color similarity measure.

An input device 52, 62, 72 of system 50, 60, 70, respectively, captures the initial color representations. In one example, the initial color representations are pixels. In one example, the image is a vector image and the initial color representations include vector elements. Input device 52, 72 can be included in the system, as illustrated with systems 50 and 70. Alternatively, input device 62 can be external to the system, as illustrated with system 60. Input device 52, 62, 72 can be a mobile device, such as a mobile smart phone or tablet, for example, or other input device capable of capturing or reproducing an image.

The initial color attribute representations and values can be captured in the form of a conventional color encoding, such as RGB pixel value, a three-dimensional (XYZ) measurement, or CIELAB encoding. With additional reference to FIG. 1, initial color attribute values of corresponding initial color representations are received and saved in memory 22, 54, 64, 74 of system 20, 50, 60, 70, respectively. Memory 22, 54, 64, 74 also stores instructions.

Processor 24, 56, 66, 76 executes the instructions stored in memory 22, 54, 64, 74, respectively. Processor 56, 66, 76 references a database 58, 68, 69, 78, respectively, which includes a set of lexical classifiers corresponding to particular color attribute values. Processor 24, 56, 66, 76 transforms the initial color attribute values to lexical color classifiers corresponding to the initial color representations. In one example, processor 24, 56, 66, 76 employs a transformational quantizational technique to transform the initial color attribute values to the lexical color classifiers, (i.e., the assigned color name).

After transforming the initial color attribute values to lexical color classifiers of the corresponding initial color representation, processor 24, 56, 66, 76 quantize the occurrences of each lexical color classifier as lexical color attribute values. Processor 56, 66, 76 generates a relative similarity measurement based on respective lexical color attribute values.

In one example, a color naming system is scaled to assign lexical color classifiers from a large number of names or a small number of names, depending on the intended color application. A database of sufficient size is employed to permit such scalability. A scaling component can be used to specify a subset of the set of lexical color classifiers from which lexical color classifiers can be assigned for a given color representation. The scaling component can operate algorithmically, that is, by adding the names in terms of relative frequency of use or by using less commonly used names later. For instance, the number of color names can be set at 11 to limit the range of lexical classifiers which can be assigned to 11 commonly used basic color names (e.g., red, green, yellow, blue, brown, pink, orange, purple, white, gray, and black). The scaling component can also operate in accordance with user specified directions; for example, if the user wants to use a specific name.

The lexical color classifiers are stored in database 58, 68, 69, 78. As illustrated in FIG. 6, database 78 can be within system 70 itself, or as illustrated in FIG. 4, database 58 is simply accessible to system 50 via internet or other communication mechanism. Alternatively, system 60 includes database 68 stored within system 60, as well as external database 69 which is accessible to system 60. In one example, database 68 includes a set of lexical color classifiers which is smaller than the set of lexical color classifiers stored in external database 69. External database 58, 69 can store a very large number of lexical color classifiers. Additional databases can also be used.

Databases 58, 68, 69, 78 include a collection of lexical color classifiers. The lexical color classifiers include a range of color names and can be a raw database of colors identified by people typing color names into the internet or can be a digested or cleaned pre-processed database which filters out spelling mistakes, obvious duplicates, and synonyms. Additionally, database 58, 68, 78 can include a targeted vocabulary of predefined terms associated with select color attributes. For example, the lexical color classifiers can include 11, 25 or other suitable number of preselected color names. In one example, with 25 preselected color names, 11 lexical color classifiers of commonly used color names are employed along with additional lexical classifiers (e.g., dark green and light green) which fill in between and/or are variations of the 11 common lexical color classifiers. The targeted vocabulary of predefined terms allows the creation of the sub-database set of lexical color classifiers in a reasonable amount of time due to the predefined vocabulary being lamented. The reduction in the lexical color classifiers for the predefined vocabulary allows for a quantization into a smaller number of color classifiers to be associated with the initial color attribute values. The select number of lexical color classifiers can be predetermined or can be variable.

Although specific examples have been illustrated and described herein, a variety of alternate and or equivalent implementations may be substituted for the specific examples shown and described without departing from the scope of the present disclosure. This application is intended to cover any adaptations OF variations of the specific examples discussed herein. Therefore, it is intended that this disclosure be limited only by the claims and the equivalents thereof.

The invention claimed is:

1. A system comprising:
   a memory to store instructions and initial color representations; and
   a processor to execute the instructions in the memory to:
   reference a database having a set of lexical color classifiers;
   transform each of at least a pair of initial color representations to color values associated with the set of lexical color classifiers; and
   generate a color similarity measurement related to the at least a pair of initial color representations based on the color values associated with the set of lexical color classifiers,
   wherein each of the initial color representations has an initial color attribute value that is transformed into lexical color attribute values for each of the lexical color classifiers and
   wherein the initial color attribute values have n number of color dimensions and the set of lexical color classifiers have m number of color dimensions, wherein n is less than m.

2. The system of claim 1, comprising the processor to execute the instructions in the memory to:
   select the database from a larger database based on the initial color representations.

3. The stem of claim 1, wherein generating the color similarity measurement comprises generating a cosine similarity measurement.

4. The system of claim 1, further comprising a print to print based on the color similarity measurement.

5. The system of claim 1, further comprising instructions in the memory executable by the processor to determining if the color similarity measurement indicates a match.

6. A method of measuring color similarity comprising:
   receiving an initial color representation for each of at least a pair of image elements;
   selecting a set of lexical color classifiers;
   transforming each of the initial color representations to the set of lexical color classifiers,
   wherein each of the initial color representations has an associated numeric initial color attribute value transformed into a color value for each of the set of lexical color classifiers
   and wherein the initial color attribute values have n number of color dimensions and the set of lexical color classifiers have m number of color dimensions, wherein n is less than m;
   comparing the initial color representations of the at least pair of color images based on the set of lexical color classifiers; and
   generating a relative similarity measurement of the compared initial color representations.

7. The method of claim 6, comprising:
   transforming the initial color representations into a positive numeric value in more than one of the set of lexical color classifiers.

8. The method of claim 6, wherein each of the set of lexical color representations Is a text string.

9. The method of claim 6, comprising:
   indicating a color match of the initial color representations for the relative similarity having at least a predetermined value.

10. The method of claim 6, wherein the selecting of the set of lexical color classifiers comprises:
    a process of machine color naming.

11. The method of claim 6, comprising:
    reproducing colors achieving a predetermined relative similarity.

12. The method of claim 6, wherein generating the relative similarity measurement is performed using cosine similarity.

13. The method of claim 6, wherein the transforming comprises:
    a k-nearest neighbor association.

14. The method of claim 6, further comprising using the generated color similarity measurement to select a color for printing.

15. The method of claim 6, further comprising using the generated color similarity measurement for at least one of color reproduction, color palette construction, image retrieval, and color profile creation.

16. A computer-readable storage medium storing computer executable instructions for controlling a computer to perform a method comprising:
    receiving at least a pair of initial color representations;
    selecting a set of lexical color classifiers;
    transforming each of the at least a pair of initial color representations into values within the set of lexical color classifiers, wherein each of the initial color has an initial color attribute value that is transformed into lexical color attribute values for each of the lexical color classifiers and wherein the initial color attribute values have n number of color dimensions and the set of lexical color classifiers have m number of color dimensions, wherein n is less than m;
    calculating color similarity based on values within the set of lexical color classifiers; and
    generating a relative similarity measurement of the at least a pair of initial color representations.

17. The computer-readable storage medium of claim 16, wherein the set of lexical color classifiers is selected based on the initial color representations.

18. The computer-readable storage medium of claim 16, wherein generating the relative similarity measurement is performed using cosine similarity.

19. The computer-readable storage medium of claim 16, wherein the method further comprises determining if the relative similarity measurement indicates a match.

20. The computer-readable storage medium of claim 19, wherein the relative similarity measurement is determined to indicate a match if the relative similarity measurement is between 0 and 1.

* * * * *

UNITED STATES PATENT AND TRADEMARK OFFICE
CERTIFICATE OF CORRECTION

PATENT NO. : 10,084,941 B2
APPLICATION NO. : 15/307349
DATED : September 25, 2018
INVENTOR(S) : Nathan Moroney et al.

Page 1 of 1

It is certified that error appears in the above-identified patent and that said Letters Patent is hereby corrected as shown below:

In the Claims

In Column 7, Line 27, Claim 3, delete "stem" and insert -- system --, therefor.

In Column 8, Line 2, Claim 8, delete "Is" and insert -- is --, therefor.

In Column 8, Line 33, Claim 16, after "color" insert -- representations --. (2nd occurrence)

Signed and Sealed this
Twelfth Day of February, 2019

Andrei Iancu
*Director of the United States Patent and Trademark Office*